United States Patent
Lattorff et al.

(10) Patent No.: US 10,870,403 B2
(45) Date of Patent: Dec. 22, 2020

(54) BUMPER CROSS MEMBER SYSTEM FOR A MOTOR VEHICLE, MODULAR SYSTEM, AND MOTOR VEHICLE HAVING SUCH A BUMPER CROSS MEMBER SYSTEM

(71) Applicant: VOLKSWAGEN AKTIENGESELLSCHAFT, Wolfsburg (DE)

(72) Inventors: Jens Lattorff, Isenbüttel (DE); Nils Decker, Wolfsburg (DE); Bernd Oehmke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/204,752

(22) Filed: Nov. 29, 2018

(65) Prior Publication Data

US 2019/0168700 A1 Jun. 6, 2019

(30) Foreign Application Priority Data

Dec. 6, 2017 (DE) .................. 10 2017 222 081

(51) Int. Cl.
*B60R 19/34* (2006.01)
*B60R 19/04* (2006.01)
*B60R 19/18* (2006.01)

(52) U.S. Cl.
CPC .............. *B60R 19/34* (2013.01); *B60R 19/04* (2013.01); *B60R 19/18* (2013.01); *B60R 2019/1806* (2013.01)

(58) Field of Classification Search
CPC ......... B60R 19/04; B60R 19/34; B60R 19/18; B60R 2019/186
(Continued)

(56) References Cited

U.S. PATENT DOCUMENTS 6,435,579 B1 * 8/2002 Glance .................... B60R 19/18
293/102
6,595,502 B2 * 7/2003 Koch ...................... B60R 19/04
188/377
(Continued)

FOREIGN PATENT DOCUMENTS

DE 10 2004 008 4 A1 9/2005
DE 10 2004 036 332 A1 7/2006
(Continued)

*Primary Examiner* — Dennis H Pedder
(74) *Attorney, Agent, or Firm* — Pearl Cohen Zedek Latzer Baratz LLP

(57) ABSTRACT

A bumper cross member system for a motor vehicle having a base structure including a bumper cross member that, in the post-assembly position, extends transversely relative to the vehicle, and two crash boxes that, in the post-assembly position, extend from the bumper cross member longitudinally relative to the vehicle, at least one of the following add-on elements being configured on the base structure: a cross member expansion element, which, starting from an outer side of the bumper cross member, extends transversely relative to the vehicle outwardly in such a way that an extended base structure having an enlarged width is obtained, and/or a crash box extender element that extends from the bumper cross member in the post-assembly position forwardly longitudinally relative to the vehicle in such a way that an extended base structure having an elongated crash box is obtained. Also, a modular system and a motor vehicle having a bumper cross member system.

12 Claims, 3 Drawing Sheets

(58) Field of Classification Search
USPC .................................. 293/102, 133, 149–153
See application file for complete search history.

(56) References Cited

U.S. PATENT DOCUMENTS

| | | | | |
|---|---|---|---|---|
| 8,100,444 | B2* | 1/2012 | Erzgraber | B60R 19/18 |
| | | | | 293/115 |
| 8,702,138 | B2* | 4/2014 | Ahn | B60R 19/34 |
| | | | | 293/120 |
| 8,770,638 | B2* | 7/2014 | Jeong | B60R 19/18 |
| | | | | 293/133 |
| 9,346,424 | B2* | 5/2016 | Alavandi | B60R 19/04 |
| 10,106,112 | B2* | 10/2018 | So | B60R 19/24 |
| 2004/0183318 | A1* | 9/2004 | Bird | B60R 19/38 |
| | | | | 293/149 |
| 2004/0262931 | A1* | 12/2004 | Roussel | B60R 19/18 |
| | | | | 293/120 |
| 2008/0185851 | A1* | 8/2008 | Evans | B60R 19/18 |
| | | | | 293/120 |
| 2012/0267908 | A1* | 10/2012 | Kokubo | B60R 19/34 |
| | | | | 293/133 |
| 2013/0154285 | A1* | 6/2013 | Jeong | B60R 19/34 |
| | | | | 293/133 |
| 2018/0141512 | A1* | 5/2018 | Munjurulimana | B60R 19/18 |

FOREIGN PATENT DOCUMENTS

| | | |
|---|---|---|
| DE | 10 2004 036 332 B4 | 7/2006 |
| DE | 10 2006 038 2 A1 | 2/2008 |
| DE | 10 2011 010 174 A1 | 8/2012 |
| DE | 10 2013 003 911 A1 | 9/2014 |
| DE | 10 2013 007 170 A1 | 10/2014 |
| DE | 10 2016 113 5 A1 | 1/2017 |
| DE | 10 2016 102 5 A1 | 8/2017 |
| EP | 2 484 561 A1 | 8/2012 |
| WO | WO 2007/130005 A1 | 11/2007 |

* cited by examiner

BUMPER CROSS MEMBER SYSTEM FOR A MOTOR VEHICLE, MODULAR SYSTEM, AND MOTOR VEHICLE HAVING SUCH A BUMPER CROSS MEMBER SYSTEM

CROSS-REFERENCE TO RELATED APPLICATIONS

This application claims priority from German Patent Application No. 10 2017 222 081.3, filed Dec. 6, 2017, which is hereby incorporated by reference.

FIELD OF THE INVENTION

The present invention relates to a bumper cross member system for a motor vehicle, a modular system having such a bumper cross member system, and a motor vehicle having such a bumper cross member system.

BACKGROUND OF THE INVENTION

A modular energy absorber to be provided between a bumper cross member and a bumper trim on a motor vehicle is known from the World Patent Application WO 2007/130005 A1. The energy absorber extends over the entire width of the bumper cross member and includes a plurality of energy-absorbing modules. The modules, in turn, are made of individual, energy-absorbing units. The units include a first section and a second section that are interconnected by base plates. It provides that this energy absorber be manufactured from plastic by thermoplastic reforming. Details about the specific design of the bumper cross member cannot be inferred from the document.

The German Patent Application DE 10 2013 007 170 A1 discusses a protective device for a front structure of a motor vehicle body shell. The protective device includes a wedge element that extends in the respective corner region between an end portion of a cross member and an associated longitudinal member. The aim is to improve the crash performance of motor vehicles in the event of a collision with an obstacle that entails little overlap in width. Details about the specific design of the bumper cross member cannot be inferred from the document.

The German Patent Application DE 10 2013 003 911 A1 describes a motor vehicle having a device for enhancing the passive safety of vehicle occupants. The device includes a crosspiece, which, viewed longitudinally relative to the vehicle, upstream of a front wheel, is fixed to a longitudinal member and, in the event of a crash, is configured to be plastically deformable therewith. Details about the specific design of the bumper cross member cannot be inferred from the document.

The German Examined Application DE 10 2004 036 332 B4 describes a motor vehicle having a front-end structure that is designed to inwardly angle a crash-side front wheel in response to a frontal crash that entails an overlap of up to 15 percent. The front end structure thereby includes a plurality of supporting elements. Starting from a bumper cross member referred to as a bumper, one of the supporting elements extends longitudinally relative to the vehicle and rearwardly toward the front wheel. Two further supporting elements extend from a longitudinal member transversely relative to the vehicle. This document also does not specifically refer in detail to the design of the bumper cross member.

The German Patent Application DE 10 2011 010 174 A1 discusses a bumper configuration that includes a cross member and two crash boxes located thereon. In this configuration, a linearly extending extruded section is used as a cross-member base structure. On the side of the cross-member base structure disposed oppositely to the crash boxes, a sheet-metal part is coupled to the cross-member base structure; the sheet-metal part having an arcuate shape longitudinally and, together with the cross-member base structure, having a two-part cross member.

SUMMARY OF THE INVENTION

It is an object of the present invention to provide a bumper cross member system, a modular system having such a bumper cross member system, as well as a motor vehicle having such a bumper cross member system that are cost-effective to manufacture and are flexibly adaptable to different crash requirements.

The objective is achieved in accordance with the present invention by the features of the independent claims. Other practical embodiments and advantages of the present invention are described in conjunction with the dependent claims.

An inventive bumper cross member system for a motor vehicle is based on a base structure having a bumper cross member that, in the post-assembly position, extends transversely relative to the vehicle, and two crash boxes that, in the post-assembly position, extend rearwardly and longitudinally relative to the vehicle. Two or more crash boxes are preferably provided; in the post-assembly position of the bumper cross member system, the two or more crash boxes each having the purpose of establishing a connection between the bumper cross member located in front and each of the longitudinal members adjoining therebehind longitudinally relative to the vehicle. Between the longitudinal member and the crash box, a separation plate may also be optionally located in each case that extends further outwardly, transversely relative to the vehicle and in the vertical direction of the vehicle relative to the particular crash box and the longitudinal member, and, in this way, makes it possible to connect other elements, especially to the outwardly projecting surface areas, for example, to a mounting bracket. Such a mounting bracket may be in a frame type of form and be provided as a circumferential mount for a cooler module. The bumper cross member of a base structure preferably extends over at least 50 percent of the total width of a motor vehicle (excluding the outside mirror) within which the bumper cross member system is installed or for which it is intended. It is also preferred that the bumper cross member of the base structure extend over at least 60 percent, and especially over at least 65 percent, or even over at least 70 percent of the total width of the motor vehicle. Alternatively or in addition thereto, the base structure, as such,—i.e., even without the add-on elements—is suited to be part of a crash management system of a motor vehicle, and to satisfy the national safety requirements, at least in one country or in a region encompassing a plurality of countries. For example, the bumper cross member system having a base structure may be designed for satisfying the national requirements in an Asian or European regional area.

To be able to satisfy other, more stringent requirements, as needed, using an extended base structure on the basis of the base structure explained above, at least one of the following add-on elements is attached to the base structure of a bumper cross member system according to the present invention:
a) a cross member expansion element, which, starting from an outer side of the bumper cross member, extends transversely relative to the vehicle, outwardly in such a way that an extended base structure having an enlarged width is obtained, and/or b) a crash box extender element, which extends from the bumper cross member in the post-assembly position forwardly longitudinally relative to the vehicle in such a way that an extended base structure having an elongated crash box is obtained.

Thus, a bumper cross member system according to the present invention for a motor vehicle includes a base structure as described above, as well as at least one add-on element. In practice, two add-on elements of type a) and/or two add-on elements of type b) are each provided on the left and right side, respectively. The add-on elements make it possible for the base structure to be flexibly adapted to different crash requirements, as needed. The modular design permits a uniform single-part, and thus inexpensive, large-scale manufacture of the base structure, thus ideally for all automotive markets worldwide. It is likewise possible to install the base structure as a uniform, single part on all motor vehicles of a specific type. As already mentioned, it is thereby preferred that the base structure be designed and dimensioned in such a way that—without add-on elements—the local crash requirements will be satisfied in at least one market and thus that it be able to be used as a base structure without further modifications. By optionally providing add-on elements, the base structure may then be modified into an extended base structure and thus "upgraded," in particular to satisfy more stringent and market-specific crash requirements in certain countries or regions.

In particular, the total width of a bumper cross member may be increased, as needed, by providing a cross member expansion element, to increase the relative width of the effective bumper cross member relative to the total width of the motor vehicle. It is preferred to provide at least one left cross member expansion element and one right cross member expansion element in each case.

Alternatively or in addition thereto, providing a crash box extender element makes it possible to increase the effective length of a crash box, as needed, forwardly longitudinally relative to the vehicle. It is preferred in each case to provide a left crash box extender element and a right crash box extender element that extend out forwardly from the bumper cross member longitudinally relative to the vehicle.

Overall, therefore, an inventive bumper cross member system provides a substantial variability of bumper cross member configurations that may be realized, as needed, for particular countries, regions or automotive markets. Only low warehousing, logistics and assembly costs are thereby incurred because of a base structure that may be used uniformly as a single part and because of the dimensionally significantly smaller add-on elements.

In the context of the present invention, a cross member expansion element is understood in this respect to especially be elements that extend in the installed state over a width of maximally 70 cm, preferably maximally over 60 cm, more preferably over maximally 50 cm, and especially over maximally 40 cm. In the particular case, even smaller lengths may suffice, for example, lengths from maximally 35 cm or 30 cm.

Alternatively or in addition thereto, it is preferred when the overlapping of a cross member expansion element with the bumper cross member transversely relative to the vehicle is minimal, in particular less than the length of the cross member expansion element extending from the outer end toward the vehicle exterior. The bumper cross member and the cross member expansion element may also be mounted edge to edge, so that the cross member expansion element and the bumper cross member of the base structure virtually do not overlap.

It is possible, but not mandatory that, in the post-assembly position, the cross member expansion element extends outwardly toward the vehicle exterior, but also partially rearwardly, longitudinally relative to the vehicle, so that a positive sweep is obtained between the bumper cross member of the base structure and the two outwardly configured cross member expansion elements. The cross member expansion elements may also have a curved outer contour, in particular an outer contour that is curved arcuately and rearwardly toward the vehicle exterior.

A left cross member expansion element and a right cross member expansion element are preferably provided, which, starting from an outer side of the bumper cross member, each extend toward the vehicle exterior. An extended base structure, formed by the bumper cross member and the cross member expansion elements, having an enlarged width extends, in particular over a width of at least 60 percent, more preferably over at least 70 percent, 75 percent, 80 percent, or even over 85 or 90 percent of the total width of a respective motor vehicle. Thus, a base structure having add-on elements in the form of cross member expansion elements, which exceed the width of the base structure, may satisfy certain national or regional legal requirements. This may be necessary, particularly with regard to certain pedestrian protection requirements.

A crash box extender element may extend forwardly—starting from the bumper cross member of the base structure—in particular over a length of at least 30 mm, at least 40 mm, or at least 50 mm. Also preferred are lengths of at least 60 mm, at least 70 mm, or of at least 80 mm. In practice, two crash box extender elements are preferred, which are each configured to extend forwardly in an elongation of a left crash box and of a right crash box from the bumper cross member of the base structure in an elongation of the respective crash boxes longitudinally relative to the vehicle.

It is also possible to provide the crash box extender element as an add-on element that is attached to the bumper cross member of the base structure, thus independently of the crash boxes, and only constitutes an elongation in the form of a separate element.

Alternatively, the crash box extender element may also be designed as a protruding crash box by the crash box extender element being directly joined to the crash box in a way that allows the crash box extender element to extend through the bumper cross member as a modular, elongated crash box unit.

In particular, the crash box extender element is configured to allow the effective areas of the crash box extender element extending transversely and vertically relative to the vehicle (y-z plane) and the corresponding crash box to each substantially overlap in the region adjoining the base structure. The effective areas especially overlap by more than 60 percent, in particular by more than 70 percent, preferably by more than 80 percent, and more preferably by more than 90 percent, so that—independently of the design variant—an effective unit is obtained that has a joint effective path that extends longitudinally relative to the vehicle. Such an extended base structure provided with a crash box extender element is designed to satisfy the more stringent crash requirements of certain countries or regions that are not satisfied by the base structure itself. An example would be the special crash requirements of the North American automotive market for higher driving speeds (for example, U.S. NCAP test at 56 km/h).

In a practical embodiment, the bumper cross member is formed from a profile that is open in cross section. In particular, the open profile may be a U profile, an L profile, or a hat-shaped profile. In the post-assembly position in a motor vehicle, such a profile may open forwardly or be configured to open rearwardly, particularly when it is a U-shaped or hat-shaped profile. The cross member expansion element is partially adapted to this profile at least in a region directly laterally adjoining the bumper cross member of the base structure transversely relative to the vehicle. This means that, because of an overlapping configuration transversely relative to the vehicle, the profiles have two or more common surface areas that are well suited for providing a rigid and flexurally stiff joint between the bumper cross member of the base structure and the cross member expansion element. The profiles are preferably completely mutually adapted in an overlapping region at least over one portion thereof. The advantage of this type of adaptation is that, in spite of the modular design, an extended base structure is obtained that is uniform in the crash properties thereof and has properties that are comparable to a bumper cross member that is formed in one piece.

In conjunction with profiles of the bumper cross member that open forwardly, for example, a U-shaped or hat-shaped profile, whose bore is oriented toward the front of the vehicle, it is advantageous to provide foam material as a deformation element, in particular to protect pedestrians in the event of an impact therewith.

For the sake of completeness, it should also be appreciated that the bumper cross member may also be formed of a profile that is closed in cross section or of a profile that is open in cross section, whose open side is closed by a permanently connected add-on element, in particular by a cover panel that is permanently connected to the open profile. In this case, a closed profile is formed that has a two-part construction.

In the context of the present invention, a crash box and a crash box extender element associated therewith are preferably each formed by a profile that is closed in cross section. This is especially true of two crash boxes (i.e., a left crash box and a right crash box) and the crash box extender element associated therewith in each instance (i.e., a left crash box extender element and a right crash box extender element). Suited as closed profiles are, in particular profiles having rectangular, U-shaped, or differently polygon-shaped, in particular a uniformly polygon-shaped profile cross section. The crash box and the crash box extender element are preferably designed as folding structures, i.e., in response to loading longitudinally relative to the vehicle up to a unit length, they unfold in an accordion-like manner, in order to convert a large portion of kinetic energy into deformation energy. For that purpose, in fact, one or a plurality of creases may be provided in the crash boxes and/or in the crash box extender elements.

In another practical embodiment, the bumper cross member is made of a profile that is open in cross section and has at least two sides. These may be two L-shaped, U-shaped, hat-shaped sides or sides that are differently configured relative to each other. In this regard, reference is made again to the above explanations. It is advantageous when a reinforcing structure that stabilizes the relative mutual position of the sides extends between two sides of such a profile. This may be accomplished in the form of a reinforcing rib or other suitable reinforcing structure.

This type of reinforcing structure extends, in particular only over a (preferably small) portion of the width of the bumper cross member and, in particular over such a portion thereof in which a crash box extends therefrom. Besides one or a plurality of ribs, a tie rod or a connection plate, which extends between two sides of the profile and is permanently connected thereto, is also particularly suited as a reinforcing structure. Such a reinforcing structure makes it possible to prevent the sides of the bumper cross member from being spread apart in the vertical direction of the vehicle by high forces acting longitudinally relative to the vehicle, for example in the case of a frontal crash. This process, which may be avoided using the reinforcing structures, is also referred to as "mushrooming."

Providing one or a plurality of reinforcing structures on the base structure is especially advantageous when at least some of the base structures are equipped with an add-on element in accordance with variant b) explained above. Particularly when a crash box extender element is mounted on the bumper cross member in such a way that the crash box extender element itself acts as a reinforcing structure, providing a reinforcing element on the base structure makes it possible for the crash performance of the base structure to be adapted to that of the extended base structure having the crash box extender element. This makes it easier to predict the crash performance, especially through the use of simulation computations.

Other advantages of using a bumper cross member system according to the present invention are derived by forming a bore in the reinforcing structure and/or an add-on element. In the post-assembly state, the bore extends longitudinally relative to the vehicle. A screw thread may thereby be formed in one (or a plurality) of bore(s) to utilize the bore, as needed, as a towing lug for screwing in a towing lug or tow bar, as needed. Alternatively, other coupling elements may also be provided in such a bore for coupling a towing lug or tow bar, as needed, in particular a coupling geometry for a bayonet joint.

The reinforcing structure is configured, in particular, in a recess formed in the profile of the bumper cross member, especially in a way that does not allow it to protrude from the sides of the profile of the bumper cross member that extend in the transverse and longitudinal direction of the vehicle. In the case of such a reinforcing structure that is set back from the leading edges of the profile of the bumper cross member, there is initially no direct contact with the reinforcing structure in response to a crash, rather the force and energy are absorbed by the base structure and the crash boxes thereof and/or at least by one add-on element.

For the sake of completeness, it should be appreciated that the reinforcing structure may also be configured to completely or partially grip around the bumper cross member in order to stabilize the relative mutual position of the sides and to avoid mushrooming, as explained above.

In another practical embodiment of the bumper cross member system according to the present invention, the at least one add-on element is permanently connected to the reinforcing structure and/or to the base structure. Preferred is (also at least) one direct, permanent connection with the bumper cross member of the base structure. The permanent connection is made in particular by welding, bolting, riveting or by another suitable connection of directly mutually adjoining regions between the particular add-on element and the base structure. Combinations of the above mentioned connection methods may also be used. The adjoining regions may either be abutting edges or mutually contacting abutting flanges upon which the components make contact, or joint faces that overlap in the transverse and/or vertical direction of the vehicle.

Due to a high attainable flexural stiffness, joints are preferred where the add-on element has at least one joint face that is urged into contact with the base structure and/or the reinforcing structure, and, in the area of the joint face, is large enough to join the elements, which have been urged into contact by welding, riveting, bolting, or any other suitable way. Especially preferred thereby are joints that overlap transversely relative to the vehicle.

To improve the crash behavior, the crash box extender element has at least one crease. The crease thereby preferably extends transversely and/or longitudinally relative to the vehicle. In particular, a plurality of creases may be provided on the crash box extender element. The crash box likewise has, in particular, one or a plurality of creases. The creases facilitate or selectively control a desired folding of the crash box extender element or of the crash box in order to maximize the deformation energy to be absorbed. The formation of creases on the crash box extender element may also be utilized to calculate the crash performance of an inventive bumper cross member system, as needed. For example, the interspacing and/or the geometry of the creases may be selected in such a way that, in response to a frontal crash, initially the crash box extender element and then the crash box associated therewith first deform. Alternatively, a reverse failure sequence may be provided, or the two elements may be matched to have an approximately same folding force level and thus absorb energy approximately simultaneously.

When at least one tab of material serving as a joint face is formed on the at least one add-on element, on a reinforcing structure, and/or on a crash box for connection to the bumper cross member, the connection may be made very readily, and the additional weight of the add-on element minimized for the connection to the base structure. In this context, tabs of material are understood in particular to be individual material regions that project from an add-on element, that are formed to deviate—in particular to be reduced in material quantity—in comparison to an adjoining profile of the add-on element. For a rugged connection in the context of using a small amount of material, it is preferred when a plurality of tabs of material extend vertically, transversely, and/or longitudinally relative to the vehicle. Tabs of material are preferred, which, in the assembled state, are configured to overlap with a joint face of the base structure (in particular of the bumper cross member of the base structure).

The tabs of material of a cross member expansion element, which, in the assembled state, are configured to overlap with a joint face of the base structure and/or the reinforcing structure, are preferably smaller in area than the section of the cross member expansion element that extends transversely relative to the vehicle for purposes of additional enlargement. The surfaces of the tabs of material that overlap with the base structure are preferably smaller than 50 percent, preferably smaller than 30 percent, and, in addition, preferably smaller than 20 percent or 10 percent of the entire surface of the cross member expansion element, i.e., the main surface area of the cross member expansion element projects laterally from the bumper cross member of the base structure. It is thus ensured that the material used for the cross member expansion element is predominantly used for enlarging the base structure, and that, in comparison to the base structure, the extended base structure only has a low additional weight.

The present invention also relates to a modular system having a bumper cross member system as described above, a base structure being combined with various add-on elements to manufacture and thus to provide motor vehicles having a bumper cross member that differs in width and/or having a crash box that differs in effective length. With regard to the advantages of such a flexibly adaptable modular system, reference is made to the above description in conjunction with the bumper cross member system.

Moreover, the present invention relates to motor vehicles having a bumper cross member system as described above. The bumper cross member system is thereby preferably configured in a front end of a motor vehicle, in particular, viewed longitudinally relative to the vehicle, directly behind an outer skin panel (also referred to as bumper trim) of the motor vehicle and upstream of two longitudinal members, in a way that allows the crash boxes to serve as a connecting element between the longitudinal members and the bumper cross member. Thus, the bumper cross member system is preferably configured in the front section of a motor vehicle to the front of a passenger cell and the passenger compartment of the motor vehicle. However, it is not ruled out that the bumper cross member system is also analogously provided in a rear end of the car.

BRIEF DESCRIPTION OF THE DRAWINGS

Other practical specific embodiments of the present invention are described in the following in conjunction with the drawing. In the drawing.

DETAILED DESCRIPTION OF THE INVENTION

Figure 1:
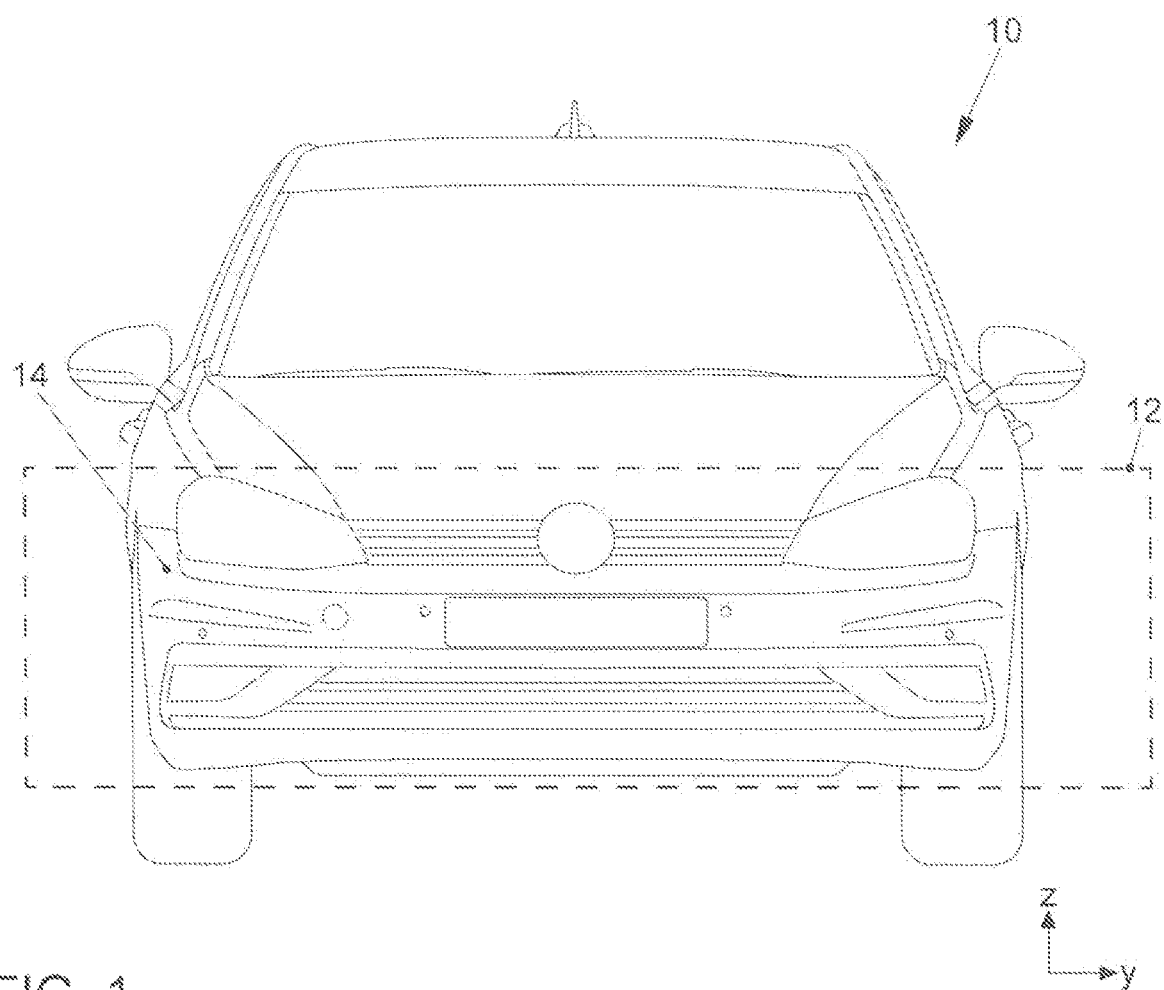
FIG. 1 is a motor vehicle in a front view.

FIG. 1 shows a vehicle 10 in a front view. A bumper cross member system 16 (not shown in FIG. 1) is mounted directly behind a bumper trim 14 in an area of a front end denoted by 12—viewed in the longitudinal direction (x direction) of the vehicle. Bumper trim 14 is part of the outer skin panel of the motor vehicle.

A bumper cross member system 16 is shown in FIG. 2 through 5 in various configurations. Only the left half of bumper cross member system 16 (viewed in the direction of travel) is shown in each case. The right half (not shown) is preferably configured to be mirror-symmetric. The directions indicated in FIG. 2 through 5 relate to the post-assembly position of bumper cross member system 16 in a motor vehicle as shown in FIG. 1.

Figure 2:
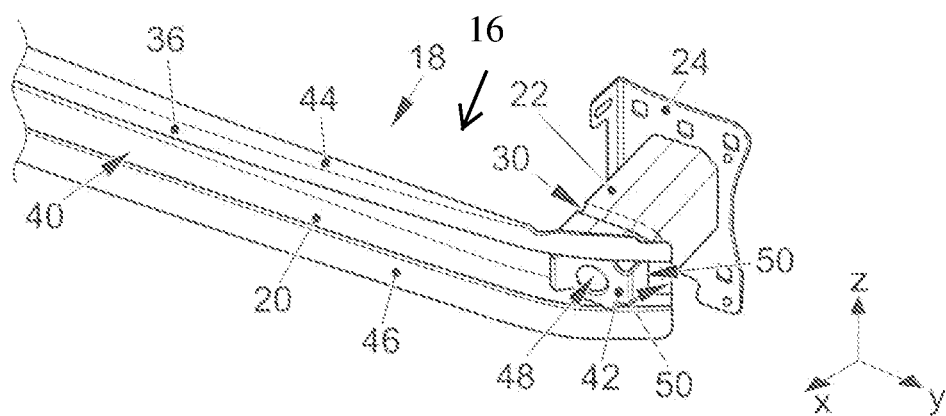
FIG. 2 is a part of a base structure of a bumper cross member system according to the present invention in a perspective, oblique front view.

FIG. 2 shows a base structure 18 as part of a bumper cross member system 16. Base structure 18 encompasses a bumper cross member 20 that, in the post-assembly position, extends in the transverse direction (y direction) of the vehicle. Extending rearwardly from bumper cross member 20 longitudinally relative to the (x direction) of the vehicle in the post-assembly position is a crash box 22. A separation plate 24 is attached to or formed on crash box 22. In the assembled state, a longitudinal member (i.e., a right longitudinal member and a left longitudinal member (not shown)) extends in each case longitudinally relative to (in the x direction) of the vehicle behind crash box 22 and separation plate 24.

Thus, base structure 18 already forms a "complete crash structure," that may be used as a crash structure in motor vehicles 10 without further add-on elements and that satisfies minimum legal requirements provided in at least one country or region.

Bumper cross member 20 is formed by a profile 36 that is open on one side and has a hat-shaped profile cross section featuring a recess 40 that extends over the entire width. Longitudinally relative to (in the x direction of) the vehicle, the opening of recess 40 is oriented toward the front of the vehicle.

A reinforcing structure 42 is configured in recess 40 of profile 36 of bumper cross member 20 in the area directly in front of crash box 22. This reinforcing structure 42 extends vertically relative to (in the z direction of) the vehicle between an upper side 44 and a lower side 46 of profile 36 of bumper cross member 20 and is permanently connected to upper side 44 and lower side 46 of profile 36. Transversely relative to (in the y direction of) the vehicle, reinforcing structure 42 extends in the area of crash box 22 and over the entire width thereof. The effect of reinforcing structure 42 is thereby that the relative position of sides 44, 46 of profile 36 do not change in response to a crash, so that profile 36 does not "mushroom." In the present case, reinforcing structure 42 has a bore 48 that extends longitudinally relative to (in the x direction of) the vehicle and, in addition, has a screw thread (not shown). Thus, reinforcing structure 42 may be used for screwing in a towing lug or tow bar.

Figure 3:
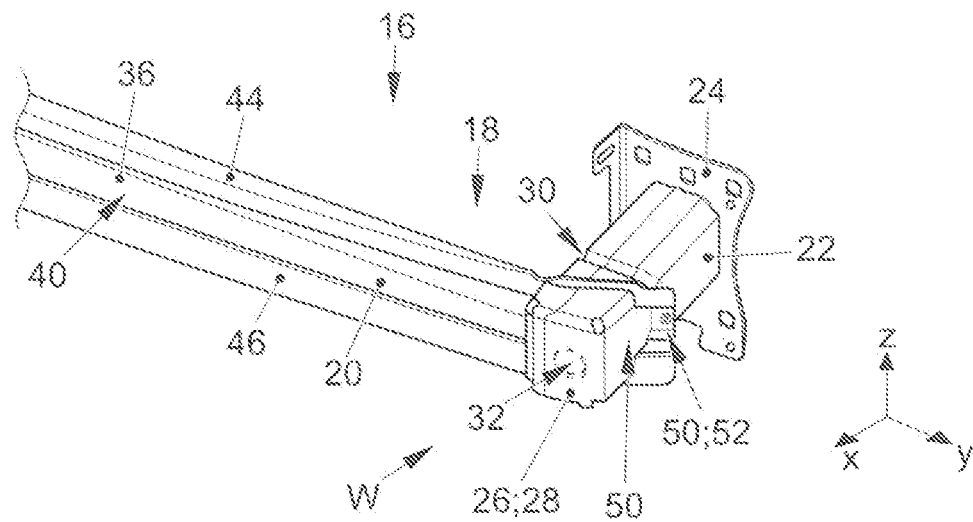
FIG. 3 is the base structure from FIG. 2 including a first add-on element in the form of a crash box extender element in a perspective, oblique front view.

In FIG. 3, bumper cross member system 16 including base structure 18 is shown in a first enhanced embodiment. In this embodiment, a first add-on element 26 in the form of a crash box extender element 28 is mounted on base structure 18. In the post-assembly position, crash box extender element 28 extends forwardly from bumper cross member 20 longitudinally relative to (in the x direction of) the vehicle; in the illustrated exemplary embodiment by approximately 70 mm. In this example, crash box extender element 28 is manufactured as a formed part from a steel material. It may also be manufactured from other materials and using other methods, and also have a multipiece design.

Overall, therefore, an extended base structure 18 having an elongated crash box 22 is formed. Both crash box 22, as well as crash box extender element 28 have a profile that is closed, viewed in cross section, and approximately rectangular in cross section, that is formed here to be constant over the length. Crash box 22 and crash box extender element 28 are each designed as folding structures, which, in response to a frontal impact acting at least partially in the longitudinal direction (x direction) of the vehicle, unfold in an accordion-like manner in order to convert as much kinetic energy as possible into deformation energy. As is discernible in FIG. 3, to facilitate a folding, crash box 22 has a crease 30 that extends transversely relative to (in the y direction of) the vehicle. For the sake of completeness, it should be appreciated that crash box extender element 28 may also have one or a plurality of creases 30.

The profile cross section of crash box extender element 28 and the profile cross section of crash box 22 are serially and sequentially disposed here longitudinally relative to (in the x direction of) the vehicle in a way that allows the effective areas to completely overlap in so far as the profile cross sections are identical in design and directly serially disposed longitudinally relative to (in the x direction of) the vehicle. Thus, for crash box extender element 28 and crash box 22, a common effective path is obtained that extends longitudinally relative to (in the x direction of) the vehicle.

As is readily discernible in conjunction with FIG. 5 and also explained in detail further below, crash box extender element 28 is permanently connected to bumper cross member 20 and reinforcing structure 42.

As indicated by dashed line bore 32 in FIG. 3, in addition to or instead of reinforcing structure 42, crash box extender element 28 may have a bore 32 that may be utilized for connecting a towing lug or tow bar.

Figure 4:
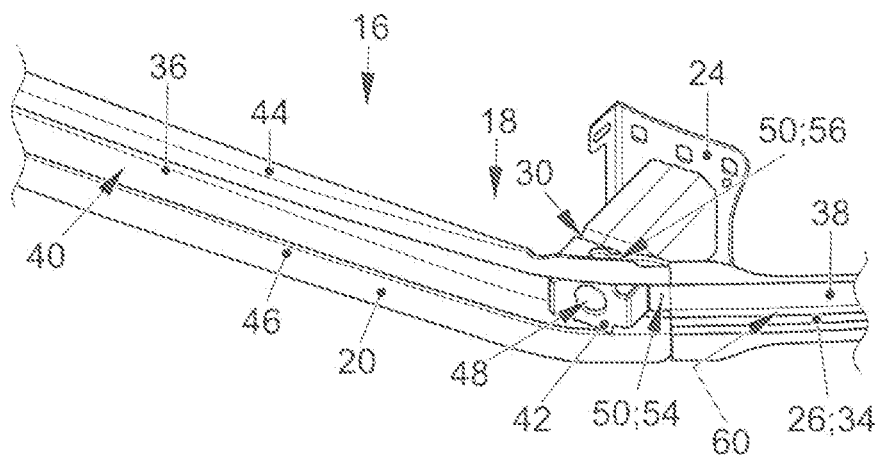
FIG. 4 is the base structure from FIG. 2 including a first add-on element in the form of a cross member expansion element in a perspective, oblique front view.

Another specific embodiment of a bumper cross member system 16 having a second add-on element 26 in the form of a cross member expansion element 34 is shown in FIG. 4. Cross member expansion element 34 extends in the present case starting from the right outer side of bumper cross member 20 transversely (in the y direction) outwardly in a way that allows an extended base structure 18 having an enlarged width to be obtained.

As is bumper cross member 20, cross member expansion element 34 is formed from a hat-shaped profile 38 that, in the region adjoining bumper cross member 20 (and here over the entire width thereof extending transversely relative to (in the y direction of) the vehicle, has a profile 38 that is adapted to profile 36 of bumper cross member 20. In the present case, the profile is identical in the adjoining region, so that the same geometry results as in the case of a bumper cross member 20 that is fabricated in one piece and that has the same width as extended base structure 18 shown in FIG. 4 having cross member expansion element 34. In the post-assembly position, cross member expansion element 34 essentially extends outwardly transversely relative to (in the y direction of) the vehicle and is additionally disposed here to also extend rearwardly in the longitudinal direction (x direction) of the vehicle.

Figure 5:
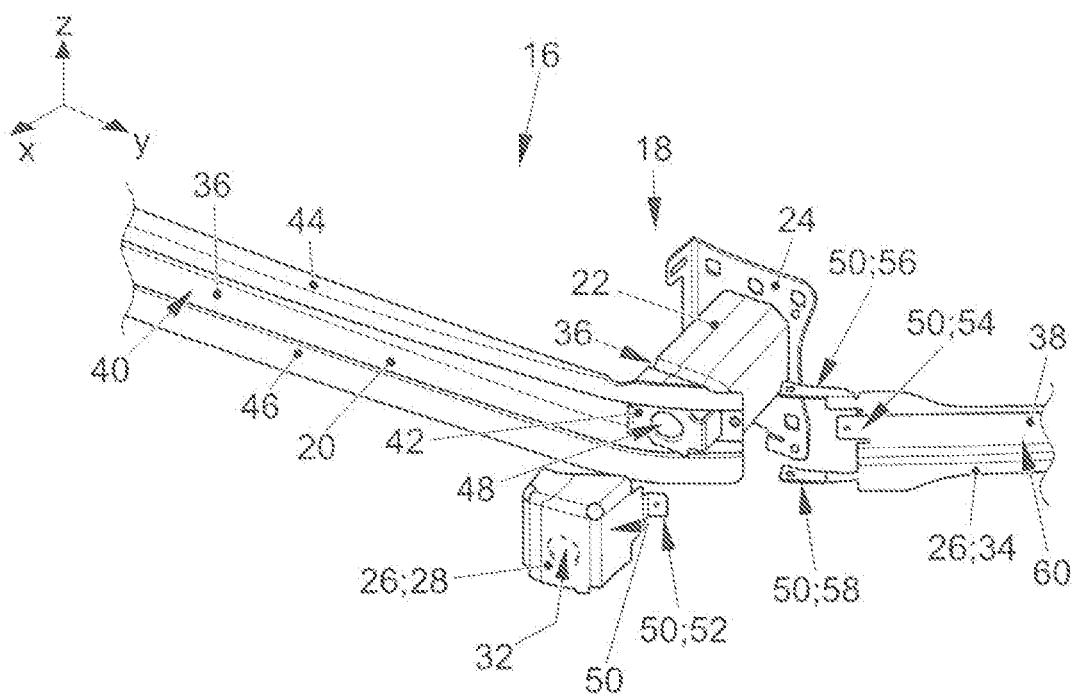
FIG. 5 is the base structure from FIG. 2 including the crash box extender element from FIG. 3 and the cross member expansion element from FIG. 4 in an exploded view.

Readily discernible in FIG. 5 is the design of add-on elements 26 for the attachment thereof to base structure 18. In the illustrated exemplary embodiments, add-on elements 26 are each connected to base structure 18 via overlapping joint faces 50.

On the right side thereof and on the left side thereof, crash box extender element 28 features a joint face 50 in the form of a tab 52 of material; only outer tab 52 of material being discernible in FIGS. 3 and 5. In the present case, tabs 52 of material are formed to project relative to crash box extender element 28 transversely relative to (in the y direction of) the vehicle. Crash box extender element 28 is connected both to bumper cross member 20, as well as to reinforcing structure 42. Crash box extender element 28 is riveted to bumper cross member 20 in the area of recess 40 via tabs 52 of material that project transversely relative to (in the y direction of) the vehicle. Here, the connection direction is longitudinal relative to (in the x direction of) the vehicle. Moreover, crash box extender element 28 is riveted to reinforcing structure 42. The connection direction of the riveting extends here transversely relative to (in the y direction of) the vehicle. Thus, relative to base structure 18, crash box extender element 28 is fabricated to be especially flexurally stiff, both longitudinally relative to (in the x direction) of the vehicle, as well as transversely relative to (in the y direction of) the vehicle.

Likewise configured on cross member expansion element 34 are joint faces 50 in the form of tabs 54, 56, 58 of material. In the present case, three inwardly extending tabs 54, 56, 58 of material are formed on cross member expansion element 34 transversely relative to (in the y direction of) the vehicle. As an elongation of a recess 60 of profile 38 of cross member expansion element 34, a first tab 54 of material is provided as a joint face to recess 40 in bumper cross member 20 of base structure 18. Overlapping joint faces 50 on bumper cross member 20 and on cross member expansion element 34 are connected by riveting longitudinally relative to (in the x direction of) the vehicle. To enhance the flexural stiffness longitudinally relative to (in the x direction of) the vehicle, a second and third tab 56, 58 are also provided that mainly extend longitudinally relative to (in the x direction of) and transversely relative to (in the y direction of) the vehicle. In the present case, second and third tab 56, 58 of material are permanently connected by riveting to the upper side and lower side of crash box 22. In this respect, the riveting takes place vertically relative to (in the z direction of) the vehicle. In the illustrated specific embodiment, the joint faces of individual tabs 54, 56, 58 of material are smaller in size than 10 percent of the total surface area of cross member expansion element 34. The greater part of the surface area of cross member expansion element 34 that faces forwardly longitudinally relative to (in the x direction of) the vehicle is laterally offset from base structure 18 and thus contributes to enlargement of base structure 18.

The features of the present invention discussed in the above specification, drawing, and claims may be essential to the implementation of the present invention in the various embodiments thereof, individually and in any combinations. The present invention may be varied within the scope of the claims and taking into account the knowledge of one skilled in the relevant art.

LIST OF REFERENCE NUMERALS

10 motor vehicle
12 region
14 outer skin
16 bumper cross member system
18 base structure
20 bumper cross member
22 crash box
24 separation plate
26 add-on element
28 crash box extender element
30 crease
32 bore
34 cross member expansion element
36 profile
38 profile
40 recess
42 reinforcing structure
44 upper side
46 lower side
48 bore
50 joint face
52 tab of material
54 tab of material
56 tab of material
58 tab of material
60 recess

The invention claimed is:

1. A bumper cross member system for a motor vehicle, the cross member system having a base structure comprising:
   a bumper cross member that extends in a post-assembly position transversely relative to the vehicle,
   a first crash box and a second crash box, wherein, in the post-assembly position, the first crash box and the second crash box extend rearwardly from the bumper cross member longitudinally relative to the vehicle, and
   at least one add-on-element configured on the base structure, wherein:
      the at least one add-on-element comprises a first crash box extender element and a second crash box extender,
      the first crash box extender and the second crash box extender extend forwardly from the bumper cross member in the post-assembly position forwardly longitudinally relative to the vehicle in such a way that an extended base structure having an elongated crash box is obtained,
      a profile cross section of the first crash box and a profile cross section of the first crash box extender:
         are serially disposed longitudinally relative to the vehicle, and
         completely overlap transversely relative to the vehicle to form a first common effective path extending longitudinally relative to the vehicle, and
      a profile cross section of the second crash box and a profile cross section of the second crash box extender:
         are serially disposed longitudinally relative to the vehicle, and
         completely overlap transversely relative to the vehicle to form a second common effective path extending longitudinally relative to the vehicle.

2. The bumper cross member system as recited in claim 1, wherein the bumper cross member is formed of a profile that is open in cross section.

3. The bumper cross member system as recited in claim 1, wherein the first crash box and the first crash box element are each formed by a profile that is closed in cross section, and the second crash box and the second crash box extender are each formed by a profile that is closed in cross section.

4. The bumper cross member system as recited in claim 1, wherein the bumper cross member is formed of a profile that is open in cross section and includes at least two sides, and of a reinforcing structure, which stabilizes two sides of the profile relative to one another, extends between the two sides thereof.

5. The bumper cross member system according to claim 4, wherein:
   a bore that extends longitudinally relative to the vehicle in the post-assembly state is formed in at least one of the reinforcing structure and the at least one add-on element;
   the reinforcing structure is disposed in a recess formed in the profile of the bumper cross member; or
   the reinforcing structure is disposed to grip around the bumper cross member.

6. The bumper cross member system according to claim 4, wherein the at least one add-on element is permanently connected to at least one of the reinforcing structure and to the base structure.

7. The bumper cross member system as recited in claim 1, wherein the at least one add-on element has at least one joint face that is urged into contact with at least one of the base structure and a reinforcing structure or the crash box extender has at least one crease.

8. The bumper cross member system as recited in claim 1, wherein at least one tab of material, serving as a joint face on the at least one add-on element, is configured for connection to at least one of the bumper cross member, a reinforcing structure, the first crash box and the second crash box.

9. A modular system having a bumper cross member system according to claim 1, wherein a base structure is combined with various add-on elements to provide motor vehicles with at least one of a bumper cross member that differs in width, and a crash box that differs in effective length.

10. A motor vehicle having a bumper cross member system according to claim 1.

11. The bumper cross member system as recited in claim 1, wherein the at least one add-on-element further comprises a cross member expansion which, starting from an outer side of the bumper cross member, extends transversely relative to the vehicle outwardly.

12. The bumper cross member system as recited in claim 11, wherein the cross member expansion is partially adapted to the profile at least in a region directly laterally adjoining the bumper cross member, such that the cross member expansion and the bumper cross member partially overlap transversely relative to the vehicle.

* * * * *